United States Patent [19]
Brown, Jr. et al.

[11] 3,852,492
[45] Dec. 3, 1974

[54] PREPARATION OF HIGH PROTEIN EXPANDED FOOD PRODUCT

[75] Inventors: Arthur V. Brown, Jr., Fults, Ill.; Edward V. Oborsh, Ballwin, Mo.

[73] Assignee: Ralston Purina Company, St. Louis, Mo.

[22] Filed: Apr. 24, 1972

[21] Appl. No.: 247,038

Related U.S. Application Data

[63] Continuation-in-part of Ser. No. 712,592, March 13, 1968, abandoned.

[52] U.S. Cl. .............................................. 426/364
[51] Int. Cl. .............................................. A23j 3/00
[58] Field of Search ............ 99/14, 17, 18; 426/364, 426/205, 69

[56] References Cited
UNITED STATES PATENTS

| | | | |
|---|---|---|---|
| 3,488,770 | 1/1970 | Atkinson | 99/17 |
| 3,498,794 | 3/1970 | Calvert et al. | 99/17 |

*Primary Examiner*—James R. Hoffman
*Attorney, Agent, or Firm*—Virgil B. Hill

[57] ABSTRACT

This disclosure describes a novel process of producing a high protein food product from oilseed meal, fish meal, meat meal, poultry by-product meal, and microbial protein, by mixing into the proteinaceous material having a controlled moisture content, a special reagent of edible water soluble ammonium or substituted ammonium compound, and extruding such water soluble compound under elevated temperature and pressure conditions to cause physical and chemical changes, and discharging such into a zone of substantially lower pressure, such steps resulting in the conversion of the particulate moist material into an expanded, water stable, readily hydratable, chewy product having a reticulated network of interconnected fibers or cell walls.

26 Claims, No Drawings

PREPARATION OF HIGH PROTEIN EXPANDED FOOD PRODUCT

This is a continuation-in-part of U.S. application Ser. No. 712,592 filed Mar. 13, 1968 now abandoned.

BACKGROUND OF THE INVENTION

This invention relates to a method of making high protein food products, and to such products, and more particularly relates to the processing of high protein materials to obtain meat simulating products.

Meat meal, fish meal, and poultry by-product meal, although having a high protein content and being well-known to food processors, have relatively limited utility in food products, even for pets. These materials are employed in pet foods, but are relatively minor constituents. They basically do not possess a desirable food texture for people or pets. Yet they possess relatively high nutritional value, particularly in protein content.

Microbial protein produced by growing proteinaceous microorganisms on a nutrient medium, for example brewer's yeast, is another material of limited usefulness in its normal form, yet having relatively high protein content.

In recent years, Mr. Ronald Flier, another employee of the assignee herein, discovered and developed a unique, integral, edible product and related process by extrusion treating of vegetable oilseeds meals or flakes. The high protein product is not only nutritious, but also has a texture, mouth feel, water stability, and appearance attractive as a food. Hence, these oil extracted meals can be directly processed into desirable foods at a relatively low cost, rather than necessitating protein isolation from such for food uses, and also removing the limitations of usefulness of these meals as cattle fodder or fertilizer.

Although this Flier process can be practiced on a continuous basis, it was found that some operators have difficulty in continuously producing a product of unvarying characteristics so as to meet quality control standards, governmental regulations, and printed package standards. Also, start up of the process can sometimes be very difficult.

SUMMARY OF THE INVENTION

The inventors herein have discovered that certain reagents, when added to these materials in relatively small amounts, have unexpected beneficial results in the process of extruding the materials under controlled conditions of moisture, temperature, and pressure. The process produces a product that bears considerable resemblance to meat. It is resilient, integral, chewy, stable in water, and membranous in nature but affording a somewhat fibrous impression. It may be in a form that can be rehydrated readily from a dried condition.

The process enables a smooth reliable "start up," proceeds uniformly during continuous operation, and produces an extremely attractive product. Further, although the process for producing the cellular or lattice type expanded product can be readily controlled to obtain a relatively uniform product, the modified process enables operating conditions, such as temperature and pressure to be varied, without disrupting the process, in a manner to vary the product texture, resiliency, degree of expansion, thickness of cell walls, and the like, without changing the basic nature of the product.

Each of the materials results in a final product of somewhat different characteristics from the others, yet having similarities. The brewer's yeast yields a product that has a fibrous like characteristic even when viewed under magnification. The interconnected membranes may readily be segregated into fibre-like strands or bundles. The oilseed meals, meat, fish, and poultry meals produce materials that are more expanded cellular in structure. The products therefore significantly increase the potential usefulness of these materials in that they afford a highly desirable mouth feel and chewiness that is meaty in character.

Among the objects of the invention therefor is to provide a process for converting such materials, and to provide such converted food products.

In the process, the material has moisture added to reach the controlled moisture content, and has a special ammonium or substitute ammonium reagent added so that, when the mixture is subjected to controlled elevated temperatures at elevated pressures, chemical and physical changes occur in the molecular structure. When it is subsequently suddenly released into a reduced temperature and pressure zone, normally ambient, the flash off of moisture causes some expansion of the material, partial cooling, partial dehydration, and completion of conversion of the material into a self-supporting, membranous structure.

The objects of this invention therefore include the provision of such a process to produce a porous product that is an integral, reticulated network of membranes of a nature that the product may be dried and rehydrates in seconds just by adding water, resulting in a chewy chunk that is completely stable in water and has thin pliable membranes forming the cell walls.

Another object of the invention is to provide a process to produce a fibrous product that is composed of strands or bundles of interconnected membranes.

These and other objects, advantages and features of this invention will become apparent upon studying the following description.

DESCRIPTION OF THE PREFERRED EMBODIMENTS

The process herein employs materials that are relatively high in protein content, and low in fat or oil content. They may be generally divided into two different classes of materials, the first including meat meal, fish meal, poultry by-product meal and oilseed meal, and the second being microorganism proteins such as brewer's yeast or equivalent microorganism protein from other sources.

The materials may assume a variety of sizes and configurations such as flakes, granules, etc., resulting from oil extraction processes. Although some results can be obtained on oilseed meals resulting from mechanical oil extraction techniques, for dependable production of high quality product, solvent (usually hexane) extracted oilseed meal should be used because the residual oil i.e., "fat" content is relatively small, usually about 0.5 percent. It has been found to be generally desirable to keep this fat or oil substance low in this process, preferably not above about 5 percent, for dependable operation.

Vegetable oilseed meals useful for this process basically comprise those edible substances resulting from the oil extraction of soybeans, cottonseeds, peanuts (otherwise called ground nuts), sesame seeds, and sunflower seeds, with the first three being particularly important. Such "meals" are relatively high in protein, usually 40 – 50 percent by weight, and low in carbohydrates. This protein content can vary as low as about 35 percent up to 70 percent or more, and can be fortified by protein isolates or concentrates up to about 75 percent or so if desired, and still get a quality product from this process.

For this process, the carbohydrate content of the material should also be relatively low. That normal amount present in oil extracted materials can be tolerated. It is recognized that extrusion-expansion of basically carbohydrate type materials (farinaceous materials) such as oats, corn and the like has been known for years. These products rehydrate relatively slowly, and disintegrate after a relatively short soaking in water, as is known. With the present process, carbohydrate "puffing" can hinder or destroy effective conversion of the basically protein material from its particulate form into the unique water stable, chewy, resilient, rapidly rehydratable product desired. Specifically, added carbohydrate content should normally be less than about 25 percent by weight of the meal in the case of 44 percent soybean meal for example.

The moisture content of the material, normally about 12 percent by weight, is raised by adding moisture, usually water, to provide a moisture content within the range necessary for the process. Specifically, the moisture level is preferably raised to the range of about 27 – 33 percent by weight of the meal. This can vary between about 19 and 41 percent by weight. However, near the lower and upper ends of the range, there is a tendency for incomplete conversion of the material, particularly oilseed meals, into the integral reticulated, cellular lattice work so that chunks or particulate matter are interspersed within the desirable expanded product. The moisture is mixed in thoroughly for uniformity, as in a conventional paddle mixer or the like.

The special additives are also added at this stage of the process, usually as dissolved in part of the added water. Dissolution in the water enables uniform distribution of the additive throughout the material. Broadly, the additive comprises an edible, water soluble ammonium substance, specifically ammonium hydroxide and basic or acidic ammonium salts, or an edible, water soluble substitute ammonium substance such as amines or amides, e.g., urea, or the like which leave no toxic residues in the resulting product. It is believed that the nitrogen-hydrogen group common to these reagents becomes liberated in the extruder to the extent that it reacts chemically with one or more of the amino acids linked by peptide bonds to form the proteins of the meals, and most likely with the side chain carboxyl groups thereof, as of aspartic acid and glutamic acid. An exact and complete technical explanation cannot be given because of the complex nature of the protein molecules in the meal, and the inability to completely analyze the composite molecular structure of the product. Analysis and examination of the materials entering and emerging from the extruder indicate that molecular changes do occur under the elevated temperature and pressure conditions of the extruder. The additives apparently alter or assist in the alteration of the bonds, probably by breakdown and reorganization, to result in the converted product.

Only relatively small amounts of the special additive reagent need actually be added. About 0.5 to 5 parts per thousand of the material, by weight, is effective, with usual amounts added being about 1–2 parts per thousand, i.e., about 0.1 – 0.2 percent by weight. Amounts less than this can be employed in some instances and under some circumstances, depending on the particular reagent used, the operating conditions and the nature of the product desired. Amounts greater than this, e.g., about 1–2 percent, can also be employed with the excess becoming fugitive ammonia gas escaping at the extruder discharge as the pressure is released. The optimum amount can readily be determined by the operator to suit particular purposes, simply by gradually varying the concentration of the reagent in the moisture added to the material fed to the extruder during continuous operation.

Particularly good results were obtained by the inventors when using a combination of ammonium hydroxide (i.e., a solution of ammonia gas) and ammonium sulfate. Typically these would be present in an amount of about 0.1 percent by weight of the former (usually a 28 percent $NH_3$ solution in water) and 0.1 percent of the latter. The ammonium ions from both probably produce some free reactive ammonia under the elevated temperatures of the process, and although this would largely be retained in solution due to the elevated pressures, a certain degree of gaseous mobility would exist at the phase equilibrium at these conditions, so that this reactive group would not be strictly limited to liquid mobility, to thereby aid in the conversion.

Further, the sulfate radical may react with the protein also. This seems to be substantiated by the fact that a combination of these two reagents effects better results than either reagent taken alone.

In addition to the sulfate and hydroxyl anions, other common edible anions for the ammonium cation, e.g., chloride, acetate, or the like, may be used.

A factor affecting the nature of the product, particularly the product produced from oilseed meal, is the pH of the treated meal. Normally the pH will be kept between about 6 and 11, and preferably between about 6.2 and 8 which ranges are above the isoelectric point of the protein or point of minimum solubility. Since these special additives are usually slightly basic in nature, and since the pH of stored soybean meal, for example, usually declines from an initial 6.7 – 6.9 down to about 6.1 – 6.4, the addition of the additive raises the pH to a desirable value of about 6.7 – 7, particularly if $NH_4OH$ is used. If desired, stronger pH adjusting reagents such as NaOH and HCl can be added to further adjust it one way or another, but this is not normally necessary. The product may also be produced in the pH range below the isoelectric point or point of minimun solubility.

After the water and additive have been mixed thoroughly through the material, the mixture is fed into the inlet end of an elongated extruder which has an elongated, rotatably driven, helical flight screw inside a tubular barrel. The screw has its helical flights around a central shaft, with the outer periphery of the flights being closely adjacent the barrel inner periphery surface. Preferably the barrel inner periphery has elongated grooves in it. Also, preferably the root diameter of the screw shaft increases toward the discharge end of the extruder. The discharge end has a die with restricted orifice outlet means.

The moist material fed into the inlet end is forceably advanced by the helical flights of the rotating screw toward the discharge end, creating an elevated pressure in the unit as the material is forced to flow out the restricted outlet. Friction occurring between the material particles themselves and between the material and the extruder components causes the temperature to rise as the material approaches the discharge. Frequently, no further heat need be added to boost this temperature near the discharge end to the desired range. This, however, can vary with the screw speed, the screw design, the extruder length, and other such factors so that sometimes it may be desirable to add heat to the outside of the barrel as by one or more conventional peripheral steam or hot water jackets along the length of the extruder barrel. Sometimes, it may be desirable to pass cooling water through one or more of these jackets while steam, hot water, cool water, or nothing, is passed through one or more of the other jackets, to elevate the temperature at controlled zones up within the necessary range but prevent it from going too high before the material leaves the extruder. This can be readily determined by trial and error for the particular extruder employed.

Normally, the retention time of the material in the extruder is somewhat less than one minute, but can vary between about 25 – 150 seconds or so. It should be long enough for complete conversion of the material at the temperature and pressure present, but not long enough to cause objectionable scorching of the product. Scorching seems to be related to both time and temperature.

The elevated temperature in the extruder specifically must be above 212° F., and should usually be above about 220° F. It should not be above about 410° F., and should usually be below 375° F. The most preferred range is about 240° – 320° F. Variation of the temperature enables some product variation without changing its basic nature.

The pressures within the extruder are relatively high, usually being somewhere between about 200 – 1000 psi or so. The exact pressure does not appear to be critical but must be elevated to the extent that the back pressure prevents the material from passing through the extruder without complete conversion. Reasonable control of the pressure can be had by varying the added heat, the screw speed, the discharge die orifice size and the like.

In operation, therefore, the material has moisture added to bring the moisture content to within the range of about 19 – 41 percent by weight, preferably 27 – 33 percent, and has the small amount of special ammonium or substituted ammonium reagent added, in water solution form. The material, moisture and additive are thoroughly mixed along with optional coloring or flavoring agents, and the mixture is fed into and forced through an extruder under elevated pressures and in the elevated temperature range of above 212° F. to about 410° F., preferably 225° – 375° F. The product is then suddenly released through restricted orifice means into a zone of substantially lower pressure and temperature, normally ambient, to cause flash off of superheated moisture, partial dehydration of the protein structure, and expansion of the chemically and physically altered protein base material into a cellular or fibrous reticulated product. The product may be cut into chunks and is normally dried to a stable moisture content of about 8 – 12 percent. It may have the capacity to be rehydrated rapidly, usually in about 20 – 50 seconds, simply by adding water, to constitute a resilient, elastic, porous, chewy but chewable, reticulated network of thin, integrally interconnected, soft, pliable fibers or membranes forming cell walls. These combined characteristics afford chewing and mouth feel properties approaching those of meat.

The products from the meals constitute a combination of integrated reticulated fibers and membranes. The product from brewer's yeast is largely fiber-like in nature and in fact resembles chicken or turkey very closely.

Various further processing can be practiced on the extruded product such as addition of flavoring agents and dyes, to render the food most effective for the market intended. The extruded product is highly nutritious. It has a bland flavor susceptible to alteration by additives. Although this process can be practiced by following the above criteria, in order to assure that one having ordinary skill in the art can very readily practice the invention, the following specific illustrations of preferred parameter ranges and materials are given. It should be realized that these are merely exemplary of the dozens of different runs that were made, and of the literally thousands of possibilities.

ILLUSTRATION 1

Soybean meal from which the oil had been hexane extracted to a residual level of 0.5 percent by weight and which had 44 percent protein content was increased in moisture level by adding water until the moisture was 30 percent by weight. A portion of the water added had ammonium hydroxide (28 percent $NH_3$ by weight) and ammonium sulfate dissolved therein in the amounts of 0.1 percent by weight of each to the meal. This solution and the rest of the water were thoroughly mixed into the meal with a paddle mixer. This mixture was then continuously passed into and through an extruder, reaching a temperature approaching 300° F. near the discharge end of the extruder under elevated pressures, followed by discharge out the extruder restricted orifice into the atmosphere. Upon material discharge from this orifice, a portion of the superheated moisture flashed off, causing partial dehydration, partial cooling, and expansion of the integral substance into a lattice type, water stable, integral, expanded rope of cellular texture.

The expanded product was several times the size of the restricted opening and constituted a reticulated network of integrally interconnected thin membranes. It dried readily and when rehydrated by adding an excess of water, constituted a resilient, elastic, porous network of thin, integrally interconnected, soft pliable membranes. The product was completely stable against disintegration in the water, and exhibited a chewy but chewable texture approaching that of meat.

ILLUSTRATION 2

Similar to 1 except 50 percent protein soybean meal was used, the moisture was about 34 percent by weight, only ammonium sulfate was added in the amount of 0.1 percent, and the temperature was about 280° F. The product formed a little less readily and was not as desirable as that of Illustration 1, but very satisfactory.

ILLUSTRATION 3

Similar to Illustration 1 except only ammonium hydroxide was added in the amount of 0.1 percent. The product was not as desirable as that of Illustration 1, but very satisfactory.

ILLUSTRATION 4

Solvent extracted peanut meal had water added to a moisture content of about 27 percent by weight, and 0.1 by weight ammonium sulfate and 0.2 percent by weight of ammonium hydroxide (28 percent $NH_3$) added in aqueous solution, and mixed. The mixture was passed through the extruder under elevated pressures and at temperatures approaching about 290° F. near the discharge end. With discharge, expansion and flash off of some superheated moisture occurred. The product had an excellent nature similar to but slightly superior in some respects to that of the soybean product of Illustration 1.

ILLUSTRATION 5

Similar to Illustration 4 except that the amount of ammonium hydroxide was increased five fold. The process ran well. Ammonia vapors were detected at the extruder discharge, indicating an excess thereof over that necessary for reaction.

ILLUSTRATION 6

Solvent extracted cotton seed meal had moisture added to obtain a moisture content of 32 percent, with aqueous solution of 0.1 percent by weight ammonium sulfate and 0.2 percent by weight ammonium hydroxide (28 percent $NH_3$) added. The mixture was extruded at about 300° F. and under elevated pressures, and discharged with the flash off being accompanied by expansion, partial dehydration, partial cooling, and solidification. The structure was generally similar to those of soybean and peanut meal but less desirable, more dense, and darker in color.

ILLUSTRATION 7

Similar to Illustration 1 except the additive being 0.2 percent by weight urea.

ILLUSTRATION 8

Similar to Illustration 1 except 70 percent protein soybean meal was used. The product was of a similar character and satisfactory.

ILLUSTRATION 9

Poultry by-product meal was increased in moisture by adding water until the moisture was 30 percent by weight. A portion of the water added had ammonium hydroxide (28 percent $NH_3$ by weight) and ammonium sulfate dissolved therein in the amounts of 0.1 percent by weight of each to the meal. This solution and the rest of the water were thoroughly mixed into the meal with a paddle mixer. This mixture was then continuously passed into and through an extruder, reaching a temperature approaching 290° F. in the discharge end of the extruder under elevated pressures, followed by discharge through the extruder restricted orifice into the ambient atmospheric conditions. Upon material discharge from this orifice, a portion of the superheated moisture flashed off, causing partial dehydration, partial cooling, and expansion of the integral substance into a lattice type, water stable, somewhat fibrous, integral structure having chewy characteristics approaching those of meat.

ILLUSTRATION 10

Similar to Illustration 9 except starting with fish meal, and the temperature approaching 260° F. at the extruder discharge.

ILLUSTRATION 11

Similar to Illustration 9 except starting with fish meal, and using 2.0 percent by weight of ammonium hydroxide.

ILLUSTRATION 12

Similar to Illustration 9 except starting with meat meal, and using only ammonium hydroxide.

ILLUSTRATION 13

Similar to Illustration 12 except using urea as the reagent additive.

ILLUSTRATION 14

Similar to Illustration 9 except with brewer's yeast.

The number of illustrations could be almost endless, because of the various conditions and additives according to the parameter criteria stated earlier. Such would only unduly lengthen this specification. It is believed that, using the above illustrations and discussion of the criteria involved, anyone having ordinary skill in the art could alter the details of the process to obtain the product desired. These variations are considered within the inventive concept which is to be limited only by the scope of the appended claims and the reasonable equivalents thereto.

The embodiments of the invention in which an exclusive property or privilege is claimed are defined as follows:

1. A process for converting one or more of the particulate materials, meat meal, fish meal and poultry by-product meal into an expanded food product comprising the steps of moistening the meal with water to form an extrudable mixture and mixing uniformly therethrough an effective amount of an edible water soluble processing additive selected from the group consisting of amines, amides, ammonium hydroxide and ammonium salts of strong acids, maintaining the mixture at an elevated pressure and at an elevated temperature above 212°F. but below 410°F. for a period of time sufficient to cause the mixture to have an expanded structure as it is finally discharged and extruding the product through a restricted orifice into a zone of substantially lower temperature and pressure to cause flash off of moisture and expansion of the mixture thereby resulting in an expanded food product.

2. The process in claim 1 wherein the moisture content of the mixture being extruded is between about 19 and 41 percent by weight.

3. A process for converting brewer's yeast into a food product comprising the steps of; moistening the brewer's yeast with water to form an extrudable mixture and mixing uniformly therethrough an effective amount of an edible water soluble processing additive selected from the group consisting of amines, amides, ammonium hydroxide and ammonium salts of strong acids, maintaining the mixture at an elevated pressure and at an elevated temperature above 212°F. but below 410°F. for a period of time sufficient to cause the mixture to have an expanded structure as it is finally discharged and extruding the product through a restricted orifice into a zone of substantially lower temperature and pressure to cause flash off of moisture and expansion of the mixture thereby resulting in an expanded food product.

4. The process in claim 3 wherein the moisture content of the mixture being extruded is between about 19 and 41 percent by weight.

5. A process for converting a particulate vegetable oilseed protein material into a cellular porous food product stable against disintegration in water comprising the steps of moistening the meal to a moisture content of about 19 and 41 percent by weight; mixing uniformly therethrough an effective amount of edible water soluble processing additive selected from the group consisting of amines, amides, ammonium hydroxide and ammonium salts of strong acids and maintaining the mixture at an elevated pressure and at an elevated temperature between about 225° and 375°F. for a period of time sufficient to cause the mixture to have an expanded structure as it is finally discharged; and extruding the product through a restricted orifice into a zone of substantially lower temperature and pressure to cause flash off of moisture and expansion of the mixture thereby resulting in an expanded food product.

6. The process in claim 5 wherein the pH of the mixture prior to extrusion is between about 6 and 11.

7. The process in claim 5 wherein the pH of the mixture prior to extrusion is between about 6.2 and 8.

8. A process for converting a particulate vegetable oilseed protein material into a porous food product stable against disintegration in water comprising the steps of moistening the meal with water to form an extrudable mixture and mixing uniformly therethrough an effective amount of an edible water soluble processing additive selected from the group consisting of amines, amides, ammonium hydroxide, and ammonium salts of strong acids maintaining the mixture at an elevated pressure and at an elevated temperature above 212°F. but below 410°F. for a period of time sufficient to cause the mixture to have an expanded structure as it is finally discharged and extruding the product through a restricted orifice into a zone of substantially lower temperature and pressure to cause flash off of moisture and expansion of the mixture thereby resulting in an expanded food product.

9. The process of claim 8 wherein the pH of said mixture prior to extrusion is between about 6 and 11.

10. The process of claim 8 wherein the moisture content of the mixture being extruded is between about 19 and 41 percent by weight and the additive is added in an amount of between about 0.05 and 2 percent by weight of the mixture.

11. The process of claim 8 wherein the additive is added in an amount of between about 0.1 and 0.2 percent by weight of the mixture.

12. A process for converting one or more of the particulate materials, meat meal, fish meal and poultry by-product meal into an expanded food product comprising the steps of moistening the meal with water to form an extrudable mixture and mixing uniformly therethrough an effective amount of an edible water soluble processing additive selected from the group consisting of ammonium hydroxide, ammonium sulfate and urea; maintaining the mixture at an elevated pressure and an elevated temperature above 212°F. but below 410°F. for a period of time sufficient to cause the mixture to have an expanded structure as it is finally discharged and extruding the product through a restricted orifice into a zone of substantially lower temperature and pressure to cause flash off of moisture and expansion of the mixture thereby resulting in an expanded food product.

13. The process of claim 12 wherein the said reagent includes both ammonium hydroxide and ammonium sulfate.

14. The process of claim 12 wherein the moisture content of the mixture being extruded is between about 19 and 41 percent by weight.

15. A process for converting brewer's yeast into a food product comprising the steps of moistening the brewer's yeast with water to form an extrudable mixture and mixing uniformly therethrough an effective amount of an edible water soluble processing additive selected from the group consisting of ammonium hydroxide, ammonium sulfate and urea, maintaining the mixture at an elevated pressure and an elevated temperature above 212°F. but below 410°F. for a period of time sufficient to cause the mixture to have an expanded structure as it is finally discharged and extruding the product through a restricted orifice into a zone of substantially lower temperature and pressure to cause flash off of moisture and expansion of the mixture thereby resulting in an expanded food-product.

16. The process in claim 15 wherein the moisture content of the mixture being extruded is between about 19 and 41 percent by weight.

17. A process for converting a particulate vegetable oilseed protein material into a cellular porous food product stable against disintegration in water comprising the steps of moistening of the meal to a moisture content of about 19 and 41 percent by weight moisture and mixing uniformly therethrough an effective amount of an edible water soluble processing additive selected from the group consisting of ammonium hydroxide, ammonium sulfate and urea, maintaining the mixture at an elevated pressure and at an elevated temperature between about 225° and 375°F. for a period of time sufficient to cause the mixture to have an expanded structure as it is finally discharged and extruding the product through a restricted orifice into a zone of substantially lower temperature and pressure to cause flash off of moisture and expansion of the mixture thereby resulting in an expanded food product.

18. The process in claim 17 wherein the pH of the mixture prior to extrusion is between about 6 and 11, and the additive is added in an amount between about 0.05 and 2 percent by weight of the mixture.

19. The process in claim 18 wherein the pH of the mixture prior to extrusion is between about 6.2 and 8.

20. A process for converting a particulate vegetable oilseed protein material into a cellular porous food product stable against disintegration in water comprising the steps of moistening the meal with water to form an extrudable mixture and mixing uniformly therethrough an effective amount of an edible water soluble processing additive selected from the group consisting of ammonium hydroxide, ammonium sulfate and urea maintaining the mixture at an elevated pressure and at an elevated temperature above 212°F. but below 410°F. for a period of time sufficient to cause the mixture to have an expanded structure as it is finally discharged and extruding the product through a restricted orifice into a zone of substantially lower temperature and pressure to cause flash off of moisture and expansion of the mixture thereby resulting in an expanded food product.

21. The process of claim 20 wherein said reagent includes both ammonium hydroxide and ammonium sulfate.

22. The process of claim 20 wherein the pH of said mixture prior to extrusion is between about 6 and 11.

23. The process of claim 20 wherein the reagent is added in an amount of between about 0.05 and 2 percent by weight.

24. The process of claim 23 wherein the reagent is added in an amount of between about 0.1 and 0.2 percent by weight.

25. The process of claim 20 wherein the particulate vegetable oilseed protein material is soybean meal.

26. A process for converting soybean meal into a cellular expanded food product stable against disintegration in water comprising the steps of moistening the soybean meal with water to form an extrudable mixture and mixing uniformly therethrough about 0.05 and 2 percent by weight of an edible water soluble processing additive selected from the group consisting of ammonium hydroxide, ammonium sulfate and urea and forming an extrudable mixture having a pH of between about 6 and 11; maintaining the mixture at an elevated pressure and at an elevated temperature above 212°F. but below 410°F. for a period of time sufficient to cause the mixture to have an expanded structure as it is finally discharged and extruding the product through a restricted orifice into a zone of substantially lower temperature and pressure to cause flash off of moisture and expansion of the mixture thereby resulting in an expanded food product.

* * * * *